(12) United States Patent
Lowe

(10) Patent No.: US 7,249,481 B1
(45) Date of Patent: Jul. 31, 2007

(54) PROCESS FOR FORMING A HYDROFORMED AUTOMOTIVE COMPONENT WITH INTEGRATED WELD FLANGE

(75) Inventor: James Lowe, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/416,299

(22) Filed: May 1, 2006

(51) Int. Cl.
 *B21D 26/02* (2006.01)
(52) U.S. Cl. .................. 72/62; 72/58; 72/61; 29/421.1
(58) Field of Classification Search ............ 72/55, 72/57, 61, 58, 62; 29/421.1, 897.32
See application file for complete search history.

(56) References Cited

U.S. PATENT DOCUMENTS

| 4,563,230 A * | 1/1986 | Nocivelli ................... 72/61 |
| 5,050,299 A * | 9/1991 | Rainville ............... 29/897.32 |
| 5,070,717 A * | 12/1991 | Boyd et al. ................. 72/55 |
| 5,431,326 A * | 7/1995 | Ni et al. .................... 72/61 |
| 6,247,344 B1 * | 6/2001 | Eipper ....................... 72/61 |
| 6,739,166 B1 * | 5/2004 | Shah ..................... 29/421.1 |

* cited by examiner

*Primary Examiner*—David Jones
(74) *Attorney, Agent, or Firm*—Fred Owens; Miller Law Group, PLLC

(57) ABSTRACT

A process for forming a hydroformed automotive component with an integrally formed attachment bracket or weld flange begins with a tubular blank manufactured through a roll-forming process to convert sheet metal into a tubular body portion having excess parent sheet metal material extending past the tube weld joint to define an integrated flange. This integrated flange tubular blank is then placed into a forming die and subjected to a conventional hydroforming manufacturing process to form the automotive component into the desired shape and configuration. One side of the forming die is formed with a slot defining a gap in which the integrated flange material is received to create the weld flange or attachment bracket when the die is closed against the integrated flange material while the hydroforming process is undertaken. Alternatively, the integrated flange material could be welded onto the tubular blank during the formation of the tubular blank.

17 Claims, 5 Drawing Sheets

Fig. 1
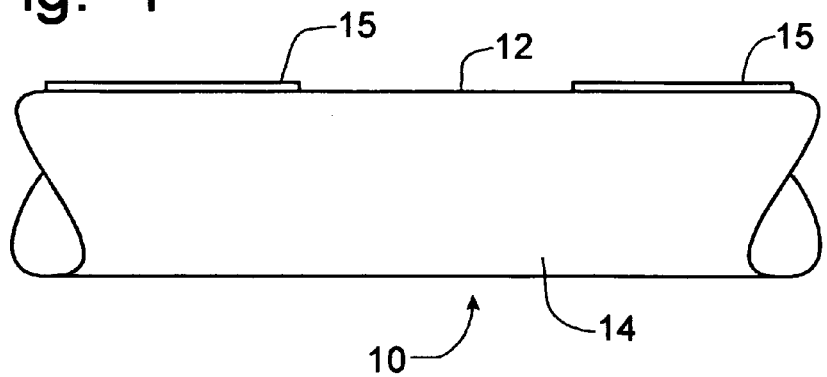
Fig. 2
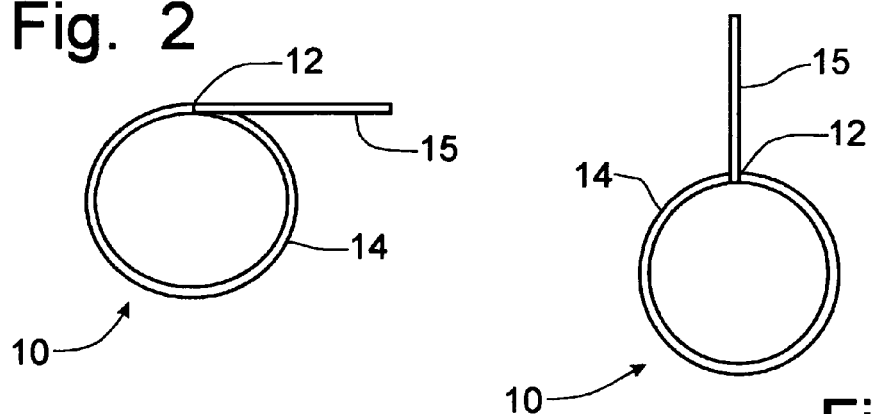
Fig. 3
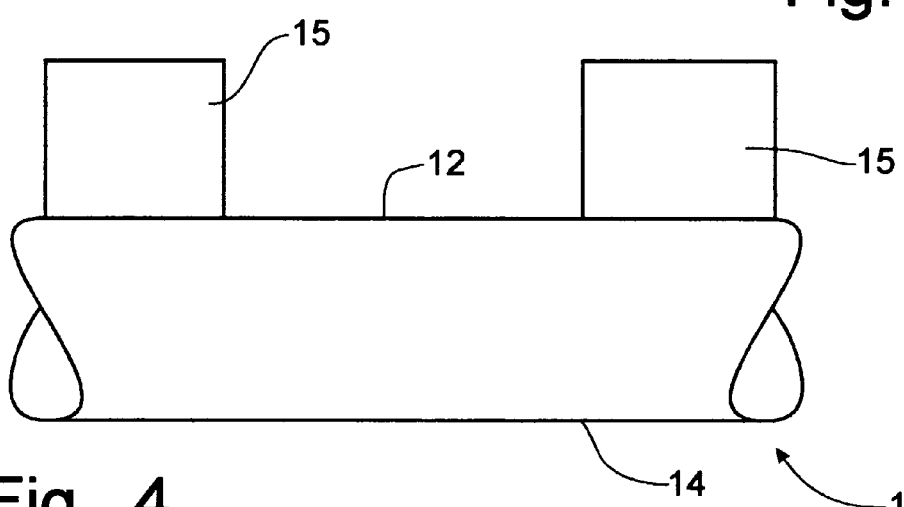
Fig. 4

Fig. 5
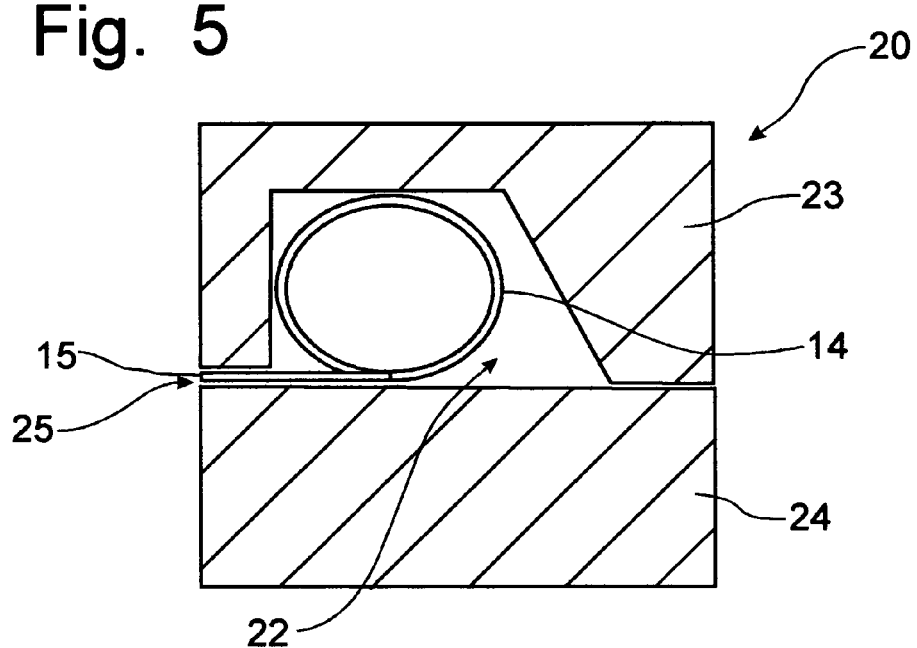
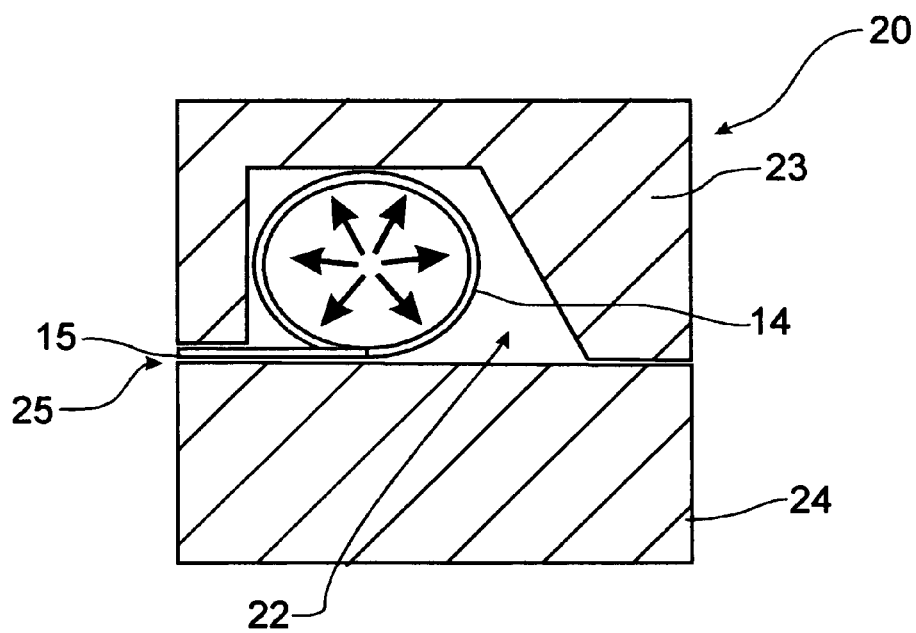
Fig. 6

Fig. 10
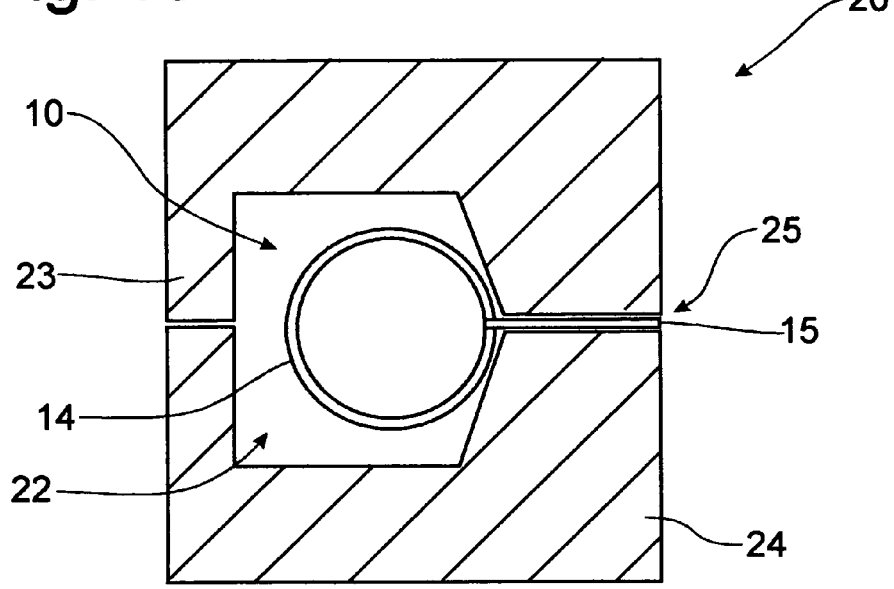
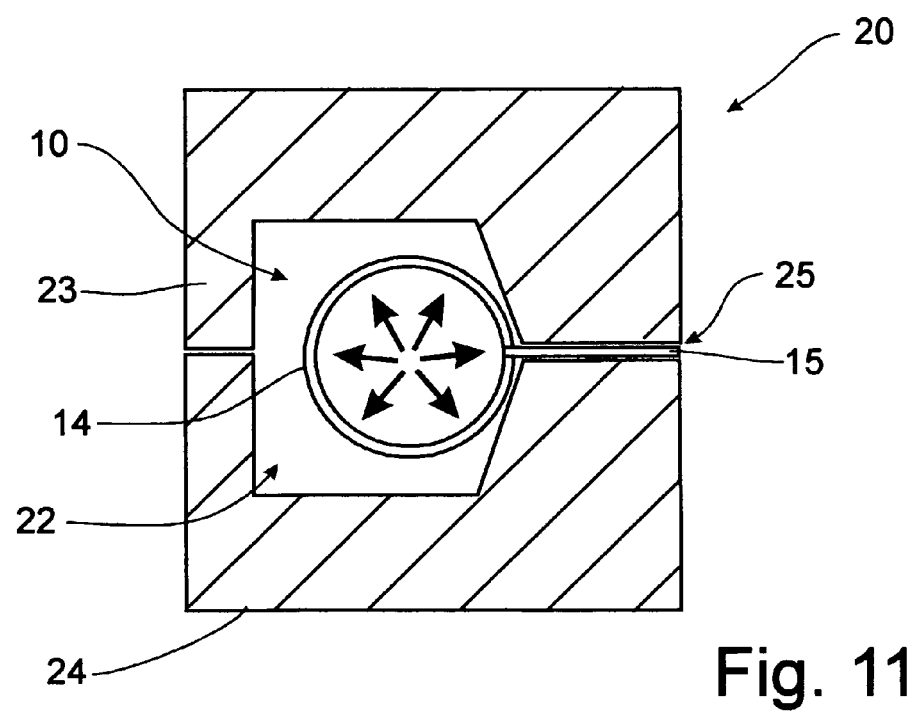
Fig. 11

PROCESS FOR FORMING A HYDROFORMED AUTOMOTIVE COMPONENT WITH INTEGRATED WELD FLANGE

BACKGROUND OF THE INVENTION

Manufacturing processes for automobiles have evolved from one that utilized primarily stamped and bent sheet metal pieces that were welded together through a MIG welding processes, i.e. a welding process in which a line of molten material is deposited by the welder in joining two pieces of metal together. Now, conventional automobile manufacturing processes incorporate in a greater degree hydroformed tubular members that are shaped to fit into the chassis of an automobile in a desired manner. The hydroformed members are particularly conducive to being welded through a spot-welding process, which involves the passage of electrical current between two electrodes to melt and join two pieces of metal placed between the electrodes. Spot-welding requires a frame design that is conducive to being manufactured using the spot-welding process. For example, if two tubular members are being spot-welded together, access to the adjoining walls of the two tubular members by the spot-welder electrodes must be provided.

Hydroforming is a process by which a standard tubular stock member is placed into a form shaped to correspond to the particular member to be formed. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members. Once the hydroformed part is formed, attachment brackets are attached to the part to permit other components of the automobile to be mounted. Typically, these attachment brackets are welded to the hydroformed part by either a MIG or spot-welding process, whereupon the other components can then be bolted or welded to the attachment brackets.

The automotive body component hydroforming manufacturing process can start with a sheet metal tube, which can be provided in a large variety of sizes and shapes, as well as material thickness and gage. The sheet metal tube can be formed through a roll-forming process in which the sheet metal is rolled into the desired generally cylindrical shape and edge welded along the seam where one edge of the rolled sheet metal adjoins the opposing edge, thereby forming a tubular member that can be hydroformed into the desired shape and configuration. However, the welding of an attachment bracket to the hydroformed part requires additional manufacturing steps and operations, which translates into dollars in additional costs.

Accordingly, it would be desirable to provide a process by which the attachment flange of an automotive frame component can be manufactured as part of the hydroforming process without requiring additional welding and assembly steps.

SUMMARY OF THE INVENTION

It is an object of this invention to overcome the aforementioned disadvantages of the known prior art by providing a process for forming a hydroformed automotive frame component that includes an attachment bracket as an integral part of the hydroformed part when the part is extracted from the forming die.

It is another object of this invention to provide a hydroformed structural member that will be formed with an integral attachment bracket as part of the hydroforming manufacturing process.

It is still another object of this invention to form the tubular blank from a roll-forming process that retains some excess sheet metal material externally of the tubular blank to permit the excess material to be formed as an attachment bracket.

It is an advantage of this invention that the costs for manufacturing a hydroformed frame component with an attachment bracket are lowered.

It is another advantage of this invention that the cost of manufacturing automobiles can be reduced.

It is another feature of this invention that the attachment bracket for a hydroformed automotive frame component can be formed in the die during the hydroforming manufacturing process.

It is still another feature of this invention that the roll-formed tubular blank is formed in a fashion that leaves excess sheet metal protruding or extending past the tube weld joint to be formed into the attachment bracket.

It is still another advantage of this invention that the excess sheet metal material can be processed through the entire hydroforming process to provide a weld flange integrally formed with the hydroformed component from the parent material.

It is yet another advantage of this invention that the disclosed manufacturing process combines two known manufacturing technologies, roll-forming and hydroforming, to create an integrated flange manufactured in the base tube.

It is a further object of this invention to provide a process structure that creates a hydroformed automotive component with an integrally formed attachment bracket or weld flange during the hydroforming manufacturing process to create a hydroformed component with weld flange/attachment bracket that is durable in construction, inexpensive of manufacture, carefree of maintenance, facile in assemblage, and simple and effective in use.

These and other objects, features and advantages are accomplished according to the instant invention by providing a process for forming a hydroformed automotive component with an integrally formed attachment bracket or weld flange. The tubular blank is manufactured through a roll-forming process to convert sheet metal into a tubular body portion having excess parent sheet metal material extending past the tube weld joint to define an integrated flange. This integrated flange tubular blank is then placed into a forming die and subjected to a conventional hydroforming manufacturing process to form the automotive component into the desired shape and configuration. One side of the forming die is formed with a slot defining a gap in which the integrated flange material is received to create the weld flange or attachment bracket when the die is closed against the integrated flange material while the hydroforming process is undertaken. Alternatively, the integrated flange material could be welded onto the tubular blank during the formation of the tubular blank.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a side elevational view of a first embodiment of a tubular blank formed through a roll-forming process in accordance with the principles of the instant invention to establish discrete strips of integrated flange sheet metal material projecting tangentially away from the tubular weld joint;

FIG. 2 is an end view of the tubular blank depicted in FIG. 1;

FIG. 3 is a side elevational view of an alternative embodiment of a tubular blank formed through a roll-forming process in accordance with the principles of the instant invention to establish discrete strips of integrated flange sheet metal material projecting diametrically away from the tubular weld joint;

FIG. 4 is an end view of the tubular blank depicted in FIG. 3;

FIG. 5 is a diagrammatic cross-sectional view of the hydroforming die with the tubular blank with an integrated flange material, as depicted in FIGS. 1 and 2, placed therein according to the principles of the instant invention;

FIG. 6 is a diagrammatic cross-sectional view of the hydroforming die depicted in FIG. 5 with pressurized fluid injected into the tubular blank to start the hydroforming process;

FIG. 10 is a diagrammatic cross-sectional view of the hydroforming die with the tubular blank with an integrated flange material, as depicted in FIGS. 3 and 4, placed therein according to the principles of the instant invention;

FIG. 11 is a diagrammatic cross-sectional view of the hydroforming die depicted in FIG. 10 with pressurized fluid injected into the tubular blank to start the hydroforming process;

DETAILED DESCRIPTION OF THE PREFERRED EMBODIMENT

Figure 7:
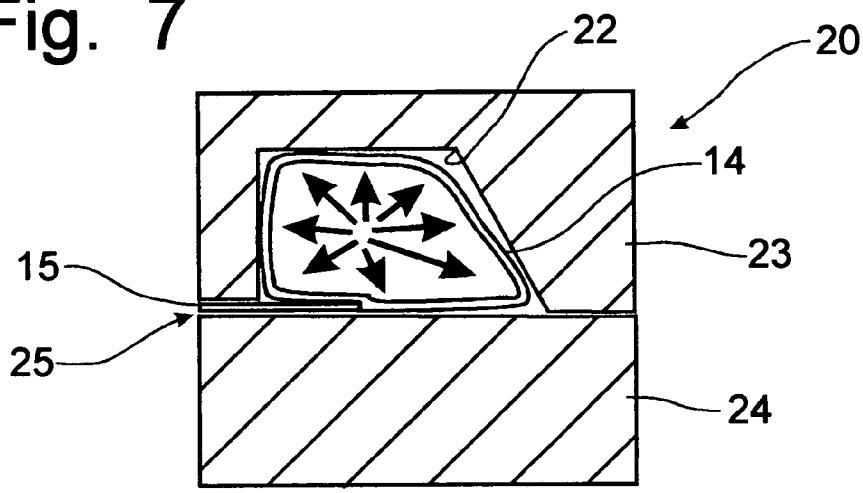
FIG. 7 is a diagrammatic cross-sectional view of the hydroforming die depicted in FIG. 6 showing the deformation of the tubular blank into the confined space within the hydroforming die, the integrated flange material being restrained within the die.

Referring to FIGS. 1-4, tubular blanks formed to be utilized in a hydroforming process incorporating the principles of the instant invention can best be seen. The tubular blank 10 is formed through a generally conventional roll-forming process in which a flat piece of sheet metal is rolled into a generally cylindrical shape and welded along a weld joint 12 to create a tubular member. The actual shape of the tubular member 10, as well as the length of the tubular member 10 is dependent on the final shape to be created in the hydroforming process, but for the sake of description of the instant invention, the tubular blank will be described as being circular or cylindrical. In FIG. 2, the cross-sectional configuration of the tubular blank 10 is more of an oval, while the embodiment of FIG. 4 is circular. Nevertheless, other roll-formed shapes are equally applicable with respect to the instant invention.

During the roll-forming process, excess parent sheet metal material 15 can be left on the tubular blank 10 and oriented to extend or project outwardly away from the body 14 of the tubular blank 10. This excess parent sheet metal material 15 is positioned at locations where attachment brackets or weld flanges are desired in the final hydroformed component. Accordingly, the length and the width of the retained excess sheet metal material 15 is dependent on the desired size and shape of the attachment bracket or weld flange. For the sake of description of the instant invention, each tubular blank 10 is provided with two representative excess sheet metal appendages 15, spaced axially along the major longitudinal axis of the tubular blank 10.

In the first disclosed embodiment shown in FIGS. 1 and 2, the excess sheet metal appendages are oriented tangentially to the oval body portion 14 and project from the weld joint 12. In the alternative embodiment shown in FIGS. 3 and 4, the excess sheet metal appendages 15 are oriented generally perpendicularly to the circumference of the body portion 14 so as to project radially from the body portion 14. One skilled in the art will recognize that the orientations described above are not exclusive and can be intermingled on the same tubular blank 10. Furthermore, one skilled in the art will recognize that the appendages 15 can be bent into a desired angle other than tangential or radial to correspond to the desired position of the attachment flange on the formed component.

Figure 8:
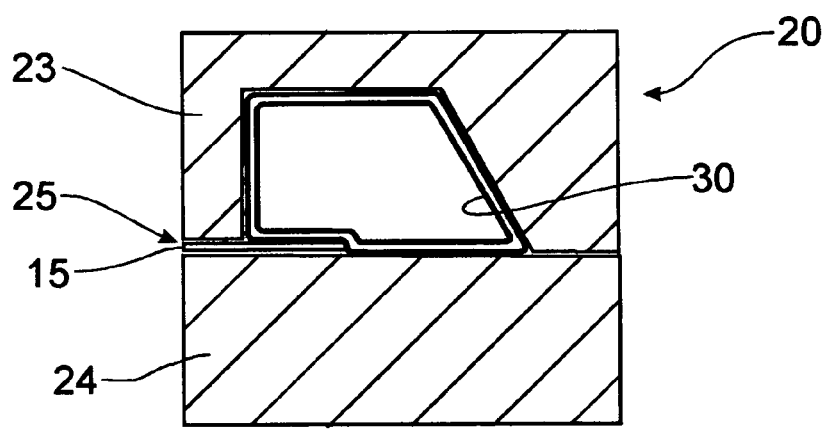
FIG. 8 is a diagrammatic cross-sectional view of the hydroforming die shown in FIG. 7 with the hydroforming process completed.
Figure 9:
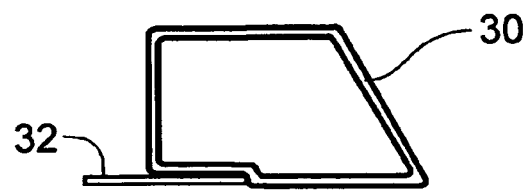
FIG. 9 is an end view of the hydroformed component with an integrated weld flange or attachment bracket projecting outwardly thereof.
Figure 12:
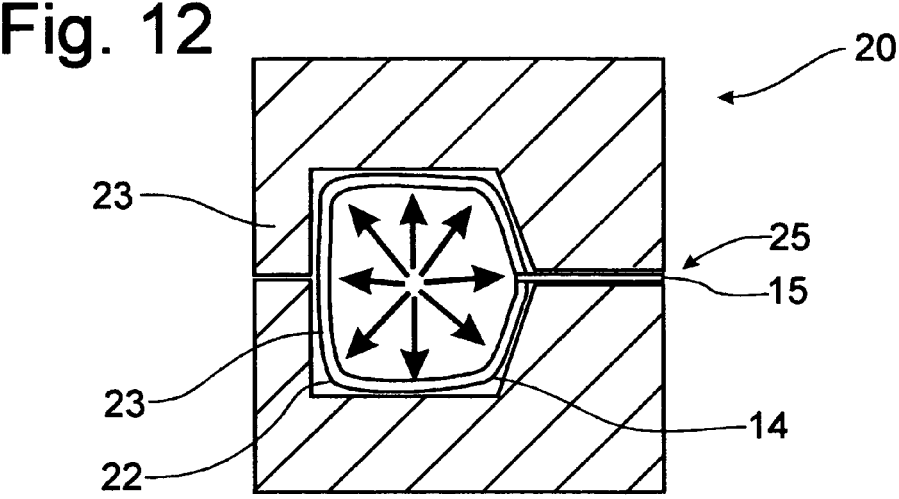
FIG. 12 is a diagrammatic cross-sectional view of the hydroforming die depicted in FIG. 11 showing the deformation of the tubular blank into the confined space within the hydroforming die, the integrated flange material being restrained within the die.
Figure 13:
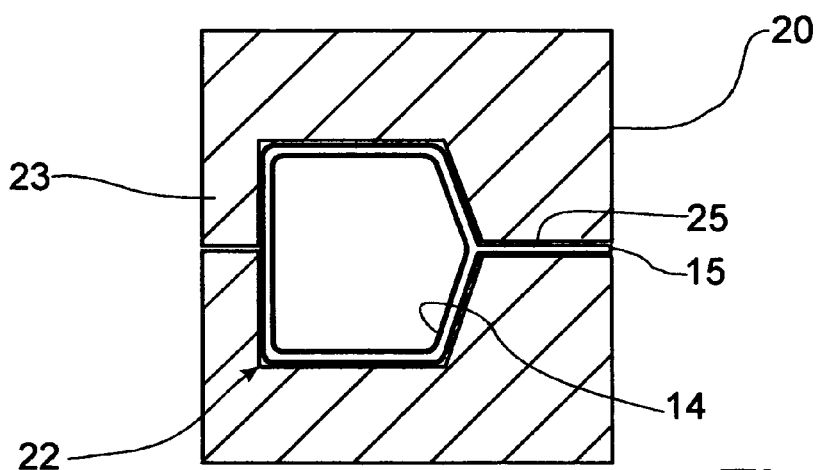
FIG. 13 is a diagrammatic cross-sectional view of the hydroforming die shown in FIG. 12 with the hydroforming process completed.
Figure 14:
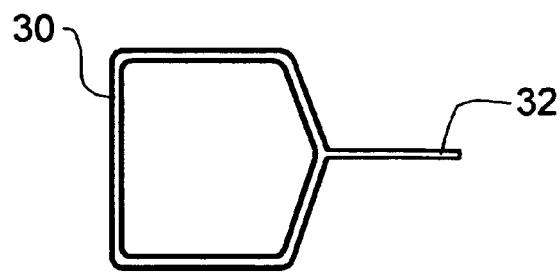
FIG. 14 is an end view of the hydroformed component with an integrated weld flange or attachment bracket projecting outwardly thereof

As depicted in FIGS. 5-14, the tubular blank 10 is placed into a hydroforming die 20 having a cavity 22 formed in the shape of the final component. The hydroforming die 20 has a top half 23 and a bottom half 24 that are connected or pressed together to form the die 20. The joint 25 on one side of the die 20 is formed to create a slot defining a gap between the top half 23 and the bottom half 24 to receive the excess sheet metal material 15 on the tubular blank 10 placed within the cavity 22. The pressing of the top half 23 and bottom half 24 of the die 20 together forms the sheet metal appendage 15 into the desired configuration as an attachment bracket or a weld flange 32 when the formed component 30 is removed from the hydroforming die 20, as is depicted in FIGS. 9 and 14, respectively. One skilled in the art will recognize that the orientation of the slot 25 with respect to the cavity 22 will correspond to the desired orientation of the appendage 15 and the ultimate attachment flange 32.

The process starts with the creation of the tubular blank 10 through a roll-forming operation with appropriate excess sheet metal appendages 15 positioned as desired along the longitudinal length of the tubular blank 10. The properly sized tubular blank 10 is loaded into an appropriately formed hydroforming die 20, as shown in FIGS. 5 and 10, with the body portion 14 of the tubular blank 10 located in the cavity 22 of the die 20 and the appendage 15 positioned in the gapped joint 25. The hydroforming die 20 is then closed against the tubular blank 10 and pressurized fluid injected into the interior of the tubular blank 10, as is depicted in FIGS. 6 and 11. The pressure of the fluid is increased, as is conventional with the hydroforming process, until the tubular blank 10 begins to deform yielding to the very high pressures within the blank 10, as is depicted in FIGS. 7 and 12.

The hydroforming process is continued until the tubular blank 10 has been deformed into the shape of the cavity 22, as is depicted in FIGS. 8 and 13. Since the excess sheet metal appendage 15 is securely held within the joint 25 of the die 20, the appendage 15 becomes the attachment bracket or weld flange 32, which for the sake of the disclosure of the instant invention has no significant difference and can be referred to as an attachment flange, that retains the shape imparted by the closure of the top and bottom halves 23, 24 of the die 20 and remains an integral part of the hydroformed component 30, which is depicted in FIGS. 9 and 14. The finished hydroformed component 30 can then be mounted to other associated components (not shown) by bolting the associated components to the attachment bracket 32 of the finished hydroformed component 30 or by welding the associated component (not shown) to the weld flange 32.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A method of forming an automotive support member comprising the steps of:
    roll-forming a tubular blank from sheet metal parent material having first and second opposing edges and an intermediate portion to create a body portion;
    welding the first edge of the parent material to the intermediate portion of the parent material along a joint to form the tubular blank;
    retaining selected excess portions of the sheet metal parent material at the joint to project outwardly from the joint to the second edge of the parent material to form an appendage;
    placing the tubular blank in a forming die having a shaped internal cavity and a slot extending outwardly from the internal cavity such that the body portion is placed in the internal cavity and the appendage is received within the slot; and
    hydroforming the tubular blank such that the body portion assumes the shape of the internal cavity to become the frame component, the appendage becoming an attachment flange projecting outwardly from the body portion for affixing the support member to another component.

2. The method of claim 1 wherein the retaining step orients at least one of the appendages tangentially with respect to the body portion.

3. The method of claim 1 wherein the retaining step orients at least one of the appendages radially with respect to the body portion.

4. The method of claim 1 wherein the placing step forms the appendage into a specified shape when the forming die is closed over the body portion within the internal cavity.

5. In a method for hydroforming an automotive frame component having a body portion formed in a desired shape with at least one attachment flange projecting outwardly therefrom, the improvement comprising the step of:
    forming each attachment flange as an appendage of material attached to the body portion of a tubular blank prior to subjecting the tubular blank to a hydroforming process to create the desired shape, each appendage having a length dimension that is smaller than a corresponding length dimension of the body portion of the tubular blank.

6. The method of claim 5 wherein the forming step includes the step of welding the appendage onto the body portion before the hydroforming process.

7. The method of claim 5 wherein the forming step includes the steps of:
    roll-forming the tubular blank from sheet metal parent material to create the body portion;
    welding the body portion along a joint to form the tubular blank; and
    retaining selected excess portions of the sheet metal parent material at the joint to project outwardly from the joint to form the appendages.

8. The method of claim 7 wherein the retaining step orients at least one of the appendages tangentially with respect to the body portion.

9. The method of claim 7 wherein the retaining step orients at least one of the appendages radially with respect to the body portion.

10. The method of claim 7 further comprising the steps of:
    placing the tubular blank in a forming die having a shaped internal cavity and a slot extending outwardly from the internal cavity and having a length dimension corresponding to the length of the formed appendage such that the body portion is placed in the internal cavity and the appendage is received within the slot; and
    hydroforming the tubular blank such that the body portion assumes the shape of the internal cavity to become the frame component, the appendage becoming an attachment flange projecting outwardly from the body portion for affixing the frame component to another component.

11. The method of claim 10 wherein the placing step forms the appendage into a specified shape when the forming die is closed over the body portion within the internal cavity.

12. The method of claim 10 wherein the appendage is oriented relative to the body portion of the tubular blank to fit within the slot prior to the tubular blank being placed into the internal cavity.

13. An automotive support member formed through a hydroforming process from a tubular blank placed into an internal cavity of a hydroforming die comprising:
    a shaped body portion of the component formed by roll-forming sheet metal parent material into the tubular blank and welding an edge of the parent material against an intermediate portion of the parent material to form a joint, the body portion having a first length dimension; and
    an attachment flange formed from an appendage of excess sheet metal parent material having a second length smaller than the first length dimension of the body portion and projecting outwardly from the joint to an opposing edge of the parent material before the hydroforming process such that the attachment flange is formed as an integral part of the body portion during the hydroforming of the tubular blank.

14. The automotive support member of claim 13 wherein the appendage is oriented generally tangentially to the body portion of the tubular blank.

15. The automotive support member of claim 13 wherein the appendage is oriented generally radially to the body portion of the tubular blank.

16. The automotive support member of claim 13 wherein the tubular blank and outwardly projecting appendage is placed into a hydroforming die having an internal cavity and an outwardly extending slot such that the body portion is received within the internal cavity and the appendage is received within the slot.

17. The automotive support member of claim 16 wherein the appendage is oriented relative to the body portion of the tubular blank prior to being placed into the hydroforming die so as to be received within the slot.

* * * * *